United States Patent [19]
Tsai et al.

[11] Patent Number: 5,917,000
[45] Date of Patent: Jun. 29, 1999

[54] MANUFACTURING PROCESS OF POLYETHER-ESTER AMIDE ELASTOMER AND ELASTIC FIBER

[76] Inventors: J. H. Tsai, 13, Alley 96, Lane 59 Nan Men Rd., Tai Chung City; J. S. Chiou, 48, Chu Hou Lane Chu Tzu Vilage, Yung Chin Town, Chang Hua; Y. K Twu, 96-2, Yuh ying Rd., Yuan Lin Town Chang Hua, all of Taiwan

[21] Appl. No.: 09/070,108

[22] Filed: Apr. 29, 1998

[51] Int. Cl.$^6$ .................................................. C08G 63/44
[52] U.S. Cl. .......................... 528/288; 528/272; 528/274; 528/301; 528/310; 528/312; 528/323; 526/64; 526/65; 264/5; 264/13
[58] Field of Search .................................... 528/272, 274, 528/288, 301, 310, 312, 323; 526/64, 65; 264/5, 13

[56] References Cited

U.S. PATENT DOCUMENTS

| | | | |
|---|---|---|---|
| 5,338,795 | 8/1994 | Fukumoto et al. | 525/66 |
| 5,409,999 | 4/1995 | Merval et al. | 525/423 |
| 5,444,120 | 8/1995 | Liedloff | 525/66 |
| 5,496,876 | 3/1996 | Jacquemin et al. | 524/155 |
| 5,506,024 | 4/1996 | Flesher | 428/85 |
| 5,539,034 | 7/1996 | Caupin et al. | 524/315 |
| 5,574,128 | 11/1996 | Judas et al. | 528/288 |
| 5,616,418 | 4/1997 | Vasselin et al. | 428/474.7 |
| 5,652,326 | 7/1997 | Veda et al. | 528/288 |

*Primary Examiner*—Samuel A. Acquah
*Attorney, Agent, or Firm*—David and Raymond; Raymond Y. Chan

[57] ABSTRACT

A manufacturing process of continuously producing a polyether-ester amide elastomer, which is adapted for mass production and reducing manufacturing cost, includes the steps of melting a poly (tetra methylene ether) glycol reactant, a ε-caprolactam reactant and an adipic acid reactant, pre-polymerizing the melted reactants by esterification and ring-opening reaction to form a pre-polymer and highly polymerizing the pre-polymer to form the polyether-ester amide elastomer. The polyether-ester amide elastomer is specifically used as a raw ingredient for producing a polyether-ester amide elastic fiber by drying the polyether-ester amide elastomer in a drying device, extruding the dried polyether-ester amide elastomer by an extruder, and molten spinning the extruded polyether-ester amide elastomer to form the polyether-ester amide elastic fiber.

23 Claims, 6 Drawing Sheets

MANUFACTURING PROCESS OF POLYETHER-ESTER AMIDE ELASTOMER AND ELASTIC FIBER

FIELD OF THE PRESENT INVENTION

The present invention relates to the technical field of producing synthetic fiber, and more particularly to a manufacturing process for continuously producing a polyether-ester amide elastomer which is a raw material for manufacturing a molten spin elastic fiber.

BACKGROUND OF THE PRESENT INVENTION

The polyether-ester amide elastomer is one of the most popular elastomer with high thermoplasticity performance. It is mainly applied in high quality exercising equipment, electrical appliances, and piping materials. Since the polyether-ester amide elastomer has good mechanical strength and stability in both high and low temperature, and good shape processing ability, it can be widely utilized in many fields.

The most commonly known conventional manufacturing process of the elastic fiber is the dry-type method of DuPont, which comprises the steps of: first, producing a composition of polyurethane (PU) elastomer; second, extruding the composition from a spinning orifice in liquid form; and third, removing solvent by blowing heated nitrogen to the liquid form composition to obtain the elastomer to form the elastic fiber. The volatilization of the solvent such as dimethyl formamide (DMF) or dimethyl acetamide (DMAC) renders a serious drawback of the above dry-type method because the volatilizing solvent is very hazardous to human health and generates a great pollution to the environment. The manufacturer must invest a huge sum of money to dispose the solvent waste; therefore the dry-type method unreasonably increases the production cost of the elastic fiber that adversely affects the marketing development and competition.

In recent years, Japan develops a new skill to manufacture elastic fiber from molten spin, such as Japanese manufacturers, Nisshinbo, Kanebo and Kuraray who invent to produce elastic fiber from molten spin of polyurethane (PU). Some other Japanese manufacturers such as Teijin and Unitika utilize molten spin of polyether-ester elastomer to produce elastic fiber. These Japanese methods are different from the above DuPont's method by eliminating the use of solvent, so that the manufacturing cost thereof is relatively lower than the DuPont's dry type method. However, the raw materials such as the polyurethane and polyether-ester have a relative low melting point, so that the physical properties of the polyurethane and polyether-ester will be damaged and deformed after heat treatment of the molten spin. Furthermore, the finished elastic fiber has to process further heat treatment, color dyeing and hydrolysis process, so that the elastic fiber produced by the molten spin method contains much more restraint in application and lower physical property than the elastic fiber made by the DuPont's dry-type method.

SUMMARY OF THE PRESENT INVENTION

It is thus a first object of the present invention to provide a manufacturing process for continuously producing a polyether-ester amide elastomer which is specifically used for manufacturing elastic fiber, wherein the manufacturing process of the polyether-ester amide elastomer has better production ability and lower manufacturing cost.

The manufacturing process of the present invention includes the steps of pre-polymerizing a plurality of reactants (including a polyether glycol reactant, an adipic acid reactant and a lactam reactant) in a reactor, heating the pre-polymerized reactants to react within a short period in a film type evaporator, removing the water content, unreacted reactant and the oligomer by vacuum suction, outputting a final product from a lower outlet of the film type evaporator which is in solidified form and is cut into granulate shaped. The present invention greatly improves the shortcomings of the batch reactor of the conventional manufacturing process and contains remarkable features as follows.

(1) The ratio of the poly (tetra methylene ether) glycol (PTMG), $\epsilon$-caprolactam (CPL) and adipic acid (AA) can be easily adjusted according to the substantial physical property required for the final product.

(2) The PTMG, CPL and AA are mixed and heated to pre-polymerize by means of a high efficiency static mixer. According to the operating mode of first-input and first-output, the degree of the polymerization of the pre-polymer depends on the time staying inside the reactor. The pre-polymer is transferred to the film type evaporator by a ration pump.

(3) The pre-polymer is rapidly heated in the film type evaporator. When a thin film of pre-polymer is formed, the water content formed during esterification, the unreacted reactant and the oligomer is rapidly removed by vacuum suction, so as to enable the high polymerization reaction to complete in a short period of time.

(4) The film type evaporator is used to process the high polymerization reaction in an orderly manner (i.e. first-input and first-output manner), so that the degree of the polymerization of the final product can be controlled by adjusting the substantial time of the reactant stayed in the film type evaporator.

(5) The final product, which is formed after the high polymerization reaction, is output from the lower outlet of the film type evaporator and transferred by the gear pump to a water basin for cooling. Finally, the solidified final product is cut into granulate shaped by a cutting machine.

A further object of the present invention is to provide a manufacturing process of a polyether-ester amide elastic fiber from the polyether-ester amide elastomer, wherein the polyether-ester amide elastomer achieved by the above process is acted as the raw material which is heated to melt by a drying extruder The melted polyether-ester amide elastomer is pressed to polyether-ester amide elastic fiber by passing through a two-piece spinning orifice assembly which is then collected by a winding machine via two godet rolls in high speed forward direction. The manufacturing process of the present invention also contains the advantages as follows.

(1) The polyether-ester amide elastomer is used as the raw material to produce the elastic fiber which is different from the Japanese polyurethane elastic fiber and polyether-ester elastic fiber.

(2) The molten polyether-ester amide elastomer is pressed through the two-piece spinning orifice that allows double forward alignment condition to enhance the fiber strength.

(3) Due to the one to four times of the drawing/speed ratio of the two godet rolls, the elastic fiber is highly aligned and advances crystallization so as to further enhance its strength.

(4) The elastic fiber is winded at high-speed spinning (1500 to 3000 m/min) that can enhance the fiber strength, increase the production ability and reduce the manufacturing cost. However, the conventional polyurethane elastic fiber can only be winded at low speed spinning (less than 1000 m/min).

BRIEF DESCRIPTION OF THE DRAWINGS

FIG. illustrates a flowchart of a manufacturing process of a polyether-ester amide elastomer in accordance with the present invention.

DETAILED DESCRIPTION OF THE PREFERRED EMBODIMENT

Figure 1:
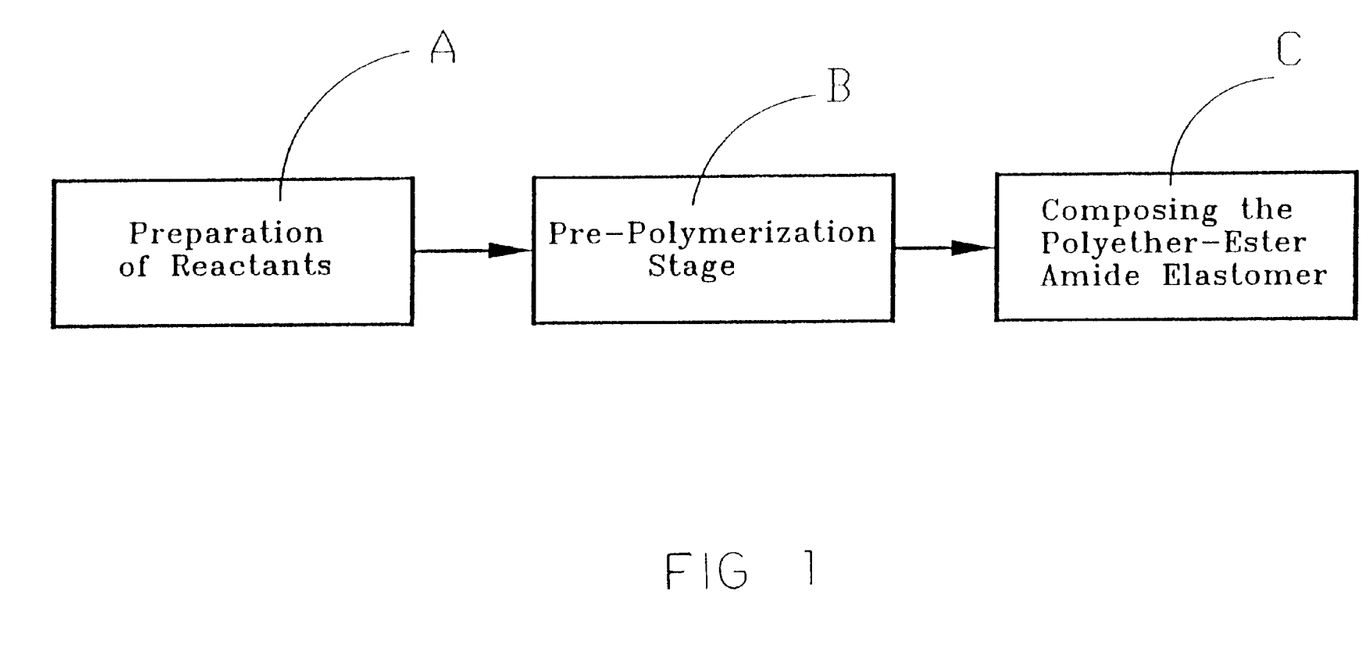
Figure 2:
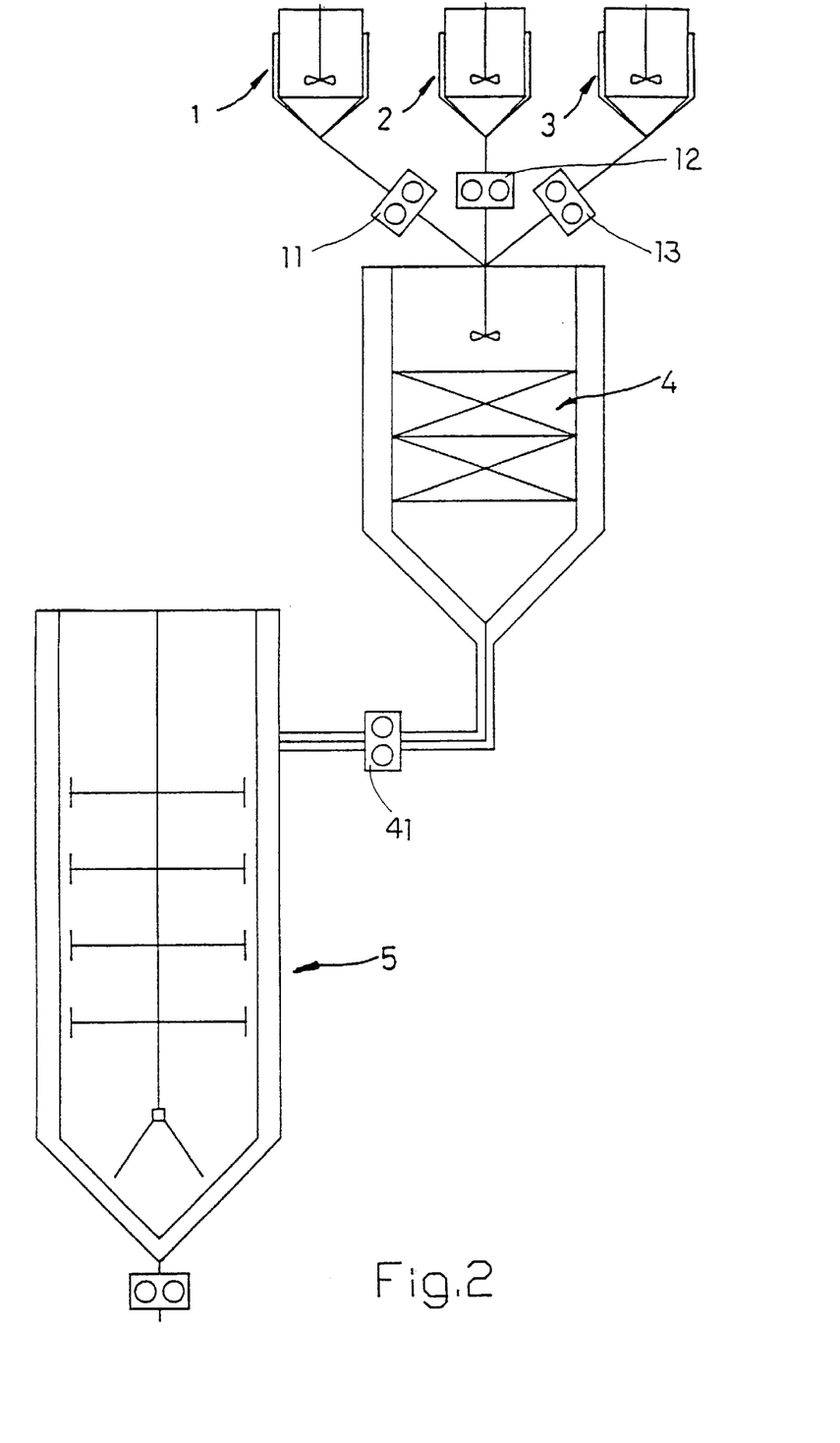
FIG. 2 is a schematic view to illustrate the manufacturing process of the present invention.

Referring to FIGS. 1 and 2, a manufacturing process of a polyether-ester amide elastomer for producing a polyether-ester amide elastic fiber comprises the following steps.

Step A: Preparation of Reactants (as shown in FIG. 1).

As shown in FIG. 2, a plurality of reactants, such as poly (tetra methylene ether) glycol (PTMG), ε-caprolactam (CPL) and adipic acid (AA) are respectively heated in a plurality of melting reactors 1, 2, and 3. The mole ratio of the AA and the PTMG is 1.01–1.06:1. The mole ratio of the CPL and PTMG is 5–20:1. The molecular weight of PTMG can be adjusted from 500 g/mole to 3000 g/mole according to the physical property of the final product required. Moreover, a stabilizer and a primary catalyst required during the reaction are measured by gear pumping and added to the melting reactors 1, 2, and 3) for well mixing.

Step B: Pre-Polymerization Stage (as shown in FIG. 1).

As shown in FIG. 2, after all the reactants are melted in the melting reactors 1, 2, 3, the reactants are respectively pumped by gear pumps 11, 12, 13 to downwardly inject into a high efficiency static mixer 4 in an orderly manner, i.e. first-input and first-output manner, wherein the amount and percentage of the melted reactants to be injected into the static mixer 4 can be adjusted according to the physical property required. The melted reactants in the static mixer 4 are heated to process an esterification, wherein the water content formed during the esterification reaction would trigger the ε-caprolactam (CPL) to process a ring-opening reaction. After a predetermined reacting time period, a pre-polymer is gradually formed and injected from a lower outlet of the static mixer 4 into a film type evaporator 5. According to the present embodiment, during this pre-polymerization stage, the preferable temperature of the pre-polymer is between 200° C. to 260° C.; the degree of vacuum of the static mixer 4 is between 10 torr to normal pressure; the reaction time period is one to four hours.

Step C: Composing the Polyether-Ester Amide Elastomer (as shown in FIG. 1)

As shown in FIG. 2, the pre-polymer is pumped to inject into the film type evaporator 5 by a gear pump 41. At the same time, a catalyst that is required for the high polymerization reaction is injected into the film type evaporator 5 by gear pumping.

Figure 3:
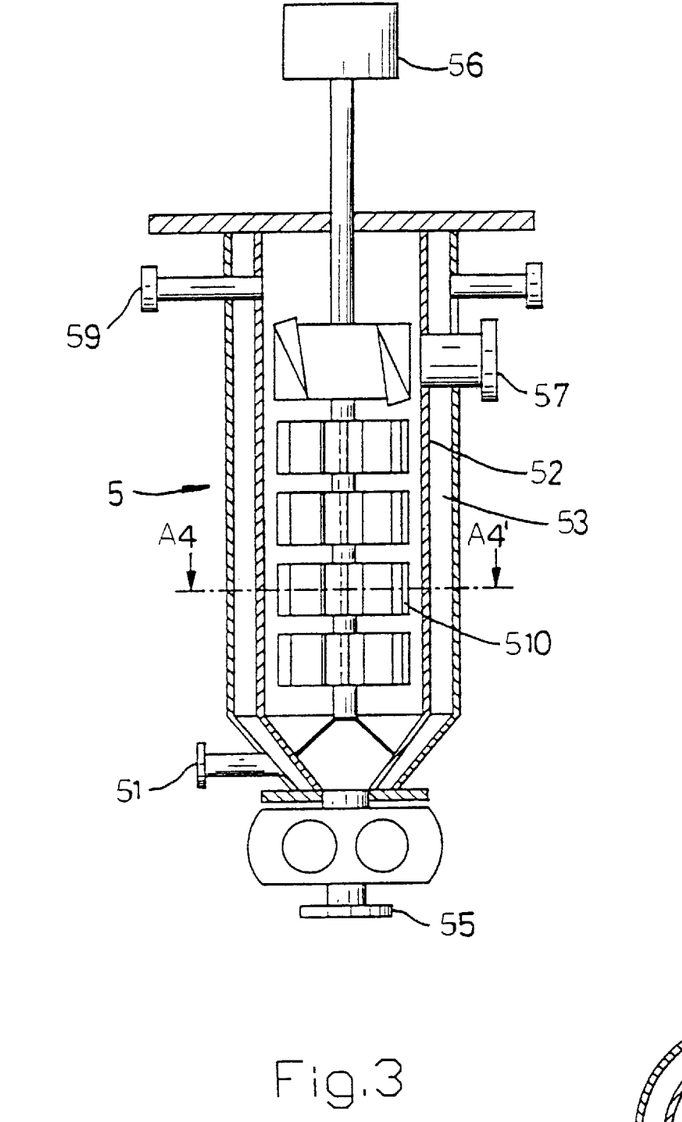
FIG. 3 is a schematic view of a film type evaporator according to the present invention.
Figure 4:
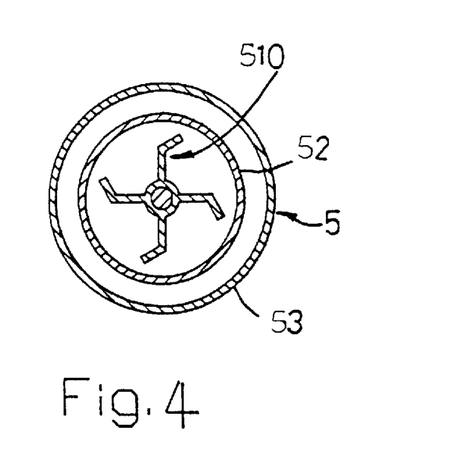
FIG. 4 is a sectional view, along the section line A4–A4' in FIG. 3, of the film type evaporator according to the present invention.

As shown in FIGS. 3 and 4, the film type evaporator 5 comprises an inner cylinder 12 coaxially disposed in an outer heating sleeve 13. The pre-polymer is transmitted into the inner cylinder 52 through an inlet 57 of the film type evaporator 5. The film type evaporator 5 further comprises a driving means 56 such as a motor to drive a plurality of mixing paddles 510, which are coaxially extended inside the inner cylinder 52, to rotate in a predetermined high speed, so as to scrape the pre-polymer positioned between the mixing paddles 510 and a surrounding wall of the inner cylinder 52 to form a thin film of pre-polymer. The film type evaporator 5 further has an inlet passage 51 to communicate with the outer heating sleeve 53, so that a heated hot media can be injected into the outer heating sleeve 53 through the inlet passage 51 in order to heat the inner cylinder 52 and the thin film of pre-polymer inside the inner cylinder 52 for advancing the polymerization reaction.

At the same time an interior chamber of the inner cylinder 52 is vacuumed to achieve an extremely low-pressure condition. When the thin film pre-polymer is under low pressure and heating condition, the side-products, the unreactant, the oligomer, and the water content can be rapidly removed by sucking out from a waste outlet 59 provided on the inner cylinder 52. At that moment, the high polymerization reaction is shifted into high gear and the ester generated by the pre-polymer is quickly combined with the CPL ring-opening matter. The degree of the polymerization of the product is also increased at high rate. The pre-polymer would be highly polymerized within 3 to 30 minutes, depending on the required physical property. The preferred temperature and vacuum degree during the high polymerization reaction are 220° C. to 240° C. and 0.1 torr to 50 torr respectively. The reaction time period of the high polymerization reaction is preferably between 3 to 30 minutes.

Finally, the final product is discharged from the lower outlet 55 and is rapidly cooled by cooling water. Then, the cooled final product is solidified and cut into granulate shaped by a cutting machine to obtain the polyether-ester amide elastomer which can be the elastomer of Nylon 6, Nylon 11, Nylon 12, Nylon 66, and etc.

The chemical formula of pre-polymerization reaction is disclosed as follows.

(1) Esterification:

(2) Esterified Pre-Polymerization Reaction:

-continued $x\text{H}_2\text{O}$ (3) Self-Inner Amide Ring-Opening Reaction:

(4) Self-Inner Amide Pre-Polymerization Reaction:

The chemical formulas for the high polymerization reaction are disclosed as follows.

(5) Poly-Amide Reaction:

(6) Poly-Ester Reaction (Formation of Segment Copolymer of High Polymerization Polyether-Ester Amide)

Wherein (1) [A], [B], [C], [D], [E] are the product of the reaction formula (1), (2), (3), (4), (5) respectively.

(2) X, Y, Z are positive integer.

The polyether-ester amide elastomer produced by the above manufacturing process is used as the raw ingredient of a polyether-ester amide elastic fiber. The manufacturing process of the polyether-ester amide elastic fiber comprises the steps as follows.

Figure 5:
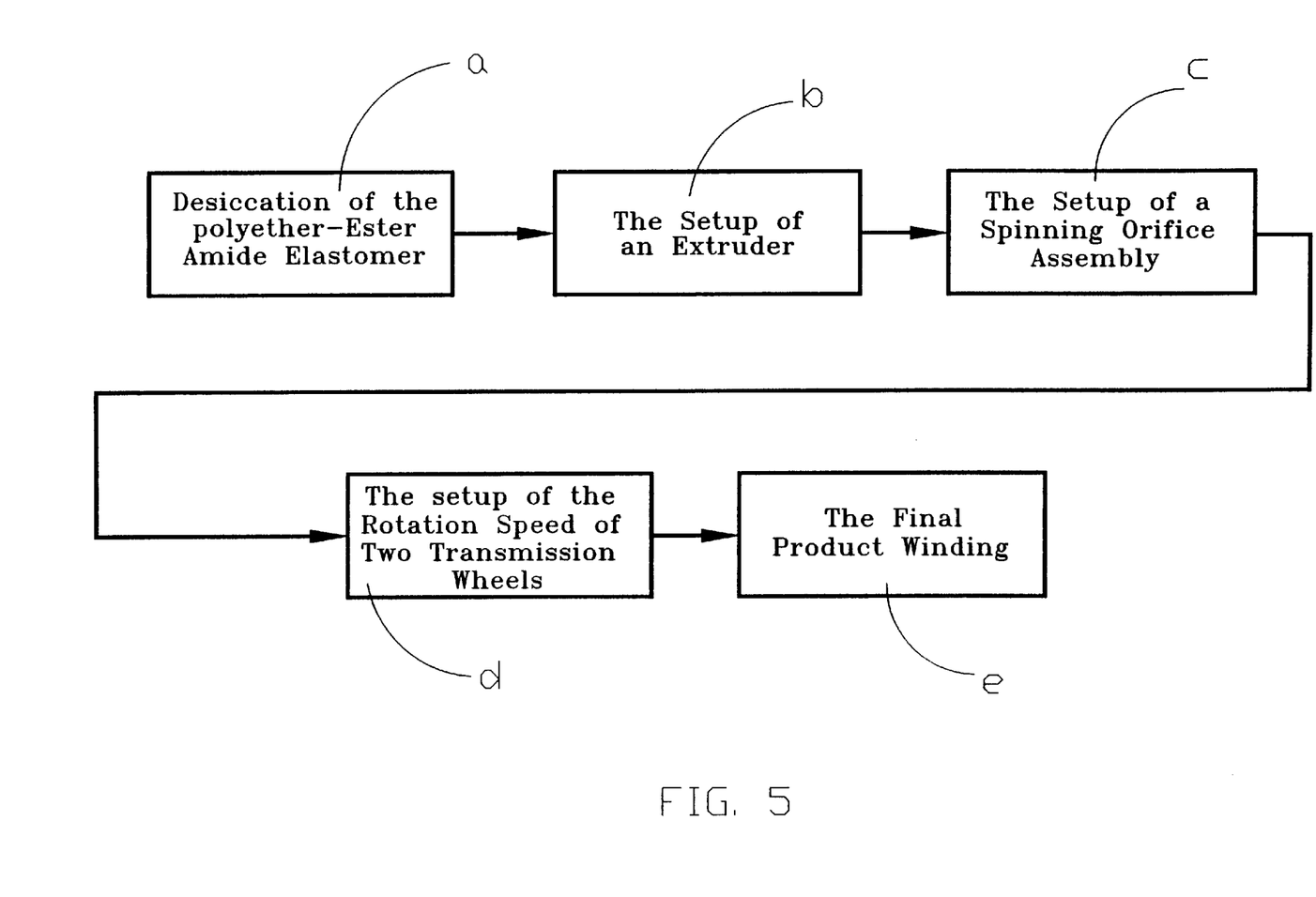
FIG. 5 illustrates a flowchart of a manufacturing process of a polyether-ester amide elastic fiber made from the polyether-ester amide elastomer according to the present invention.
Figure 6:
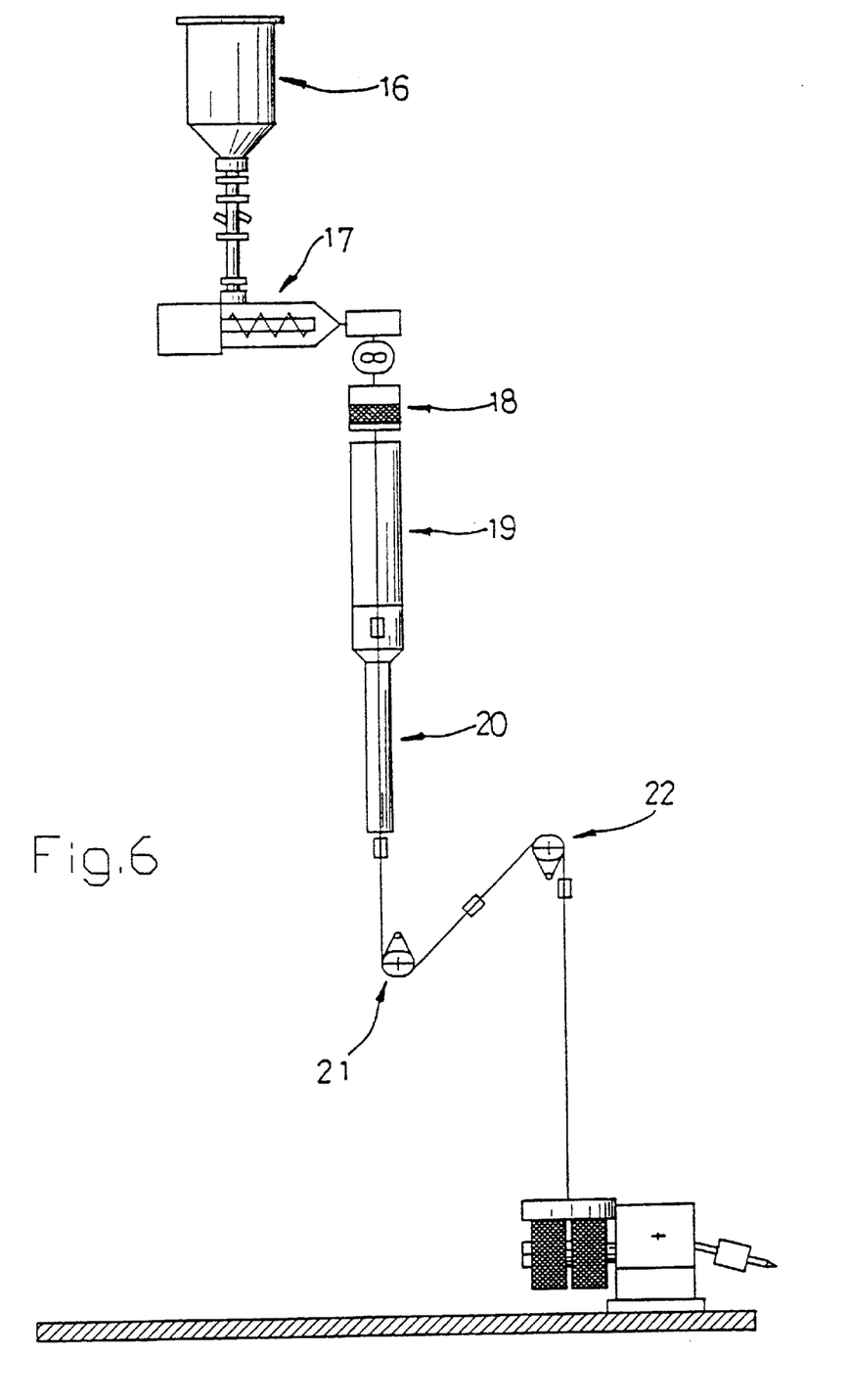
FIG. 6 is a schematic view to illustrate the manufacturing process of the present invention.
Figure 7:
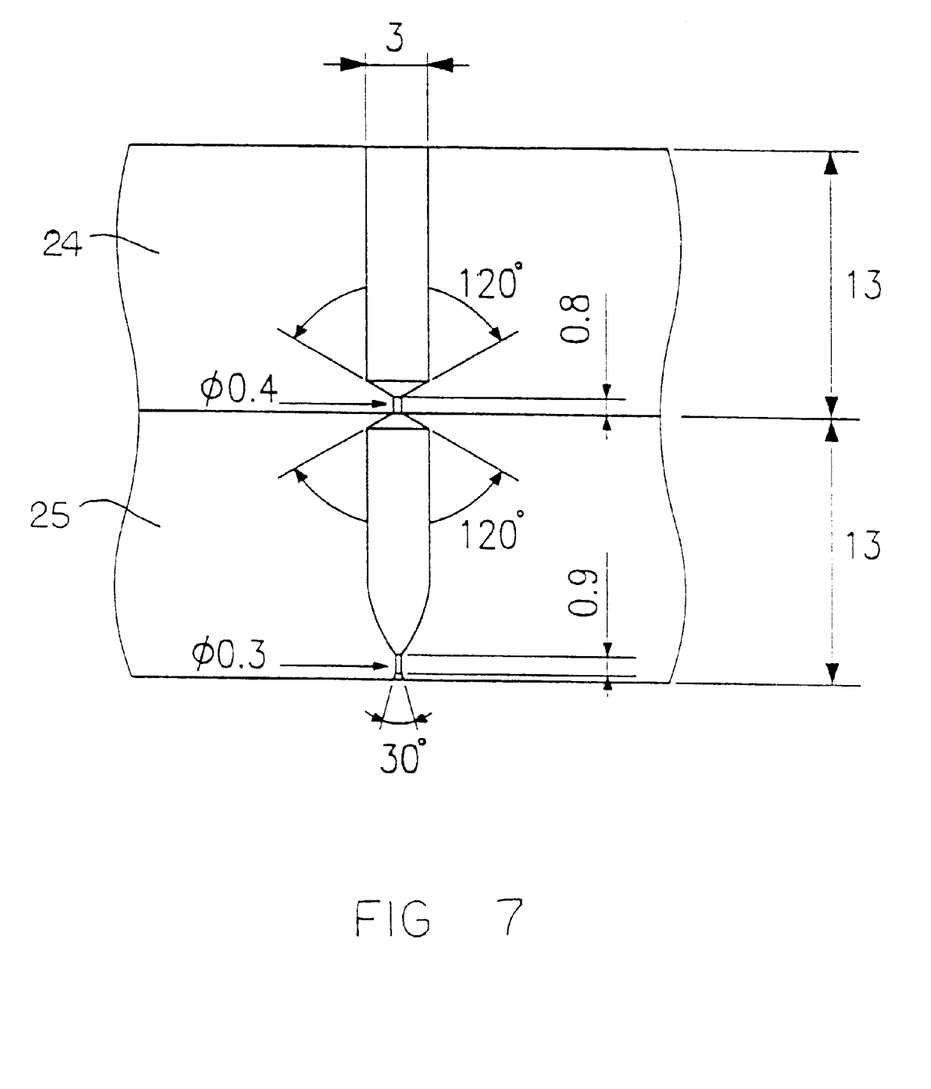
FIG. 7 is a partial view of a two-piece spinning orifice according to the present invention, wherein structural dimensions are provided in a ratio of 3:1.

(a) Drying of the Polyether-Ester Amide Elastomer:

Referring to FIGS. 5 to 7, the polyether-ester amide elastomer produced by the above manufacturing process is used as the raw ingredient, which is placed and dried inside a drying device 16. The temperature for desiccating the polyether-ester amide elastomer should not be too high because the glass transition point of the polyether-ester amide elastomer is lower than the room temperature. The proper temperature should be adjusted according to the amount of the CPL content in the polyether-ester amide elastomer. In addition, dry nitrogen gas is used to help removing the water content. The drying period usually is set between 24 to 48 hours. The water content of the polyether-ester amide elastomer should be below 300 ppm after dried.

(b) The Setup of an Extruder:

The melting point of the polyether-ester amide elastomer is between 195° C. to 205° C., depending on different combination. Therefore, the temperature of the extruder 17 which is connected to the drying device 16 is preferably set at 220° C. to 240° C. The pressure and the rotation speed of extruder 17 are preferably set at 160 to 200 kg/cm2 and 2–50 rpm respectively.

(c) The Setup of a Spinning Orifice Assembly:

( A two-piece spinning orifice assembly 18 is arranged after the extruder 17, which output end connected to a cooling fan 19 and then a spin tube 20. As shown in FIG. 7, the two-piece spinning orifice assembly 18 comprises a first spinning orifice 24 having a size of L/D=2 and a second spinning orifice 25 having a size of L/D=3, so that the molten elastomer allows double forward alignment condition to enhance the fiber strength.

(d) The Setup of the Rotation Speed of the Two Godet Rolls:

The polyether-ester amide elastic fiber output from the spin tube 20 is fed to a first godet roll 21 and then a second godet roll 22, which are used to extend the forwarding effect of the polyether-ester amide elastic fiber so as to enhance the crystallization and the physical property of the polyether-ester amide elastic fiber. The rotation speed ratio between the first godet roll 21 and the second godet roll 22 is 1/1 to 1/4. Moreover, the extension ratio between the first godet roll 21 and the second godet roll 22 is 1 to 4 times.

(e) The Final Product Winding:

Due to the fact that the polyether-ester amide elastomer has a higher polymerization and melting point, it is specifically adapted for high speed spinning. The practically speed can be as much as 1500–3000 m/min. that greatly improves the production ability and reduces the manufacturing cost while the common PU elastomer an only be spun under a relatively low rotation speed of 300–1000 m/min. of a winder. Accordingly, the polyether-ester amide elastic fiber substantially not only has a low manufacturing cost but also has a superior physical property than the PU elastic fiber.

The typical ratio of the reaction ingredient and the necessary reaction condition shown in the following table:

| e.g. | PTMG (g/mole) | Feeding Speed (g/min) PTMG | AA | CPL | Mole Ratio PTMG/AA/CPL | Pre-Polymerization Reaction Time/Temperature/Vacuum (hour)/(° C.)/(torr) | Thin Film High Polymerization Reaction Time/Temperature/Vacuum (hour)/(° C.)/(torr) |
|---|---|---|---|---|---|---|---|
| 1 | 1000 | 22.0 | 3.3 | 12.4 | 1/1.03/5 | 3.5/240/60 | 10/260/1 |
| 2 | 1000 | 16.5 | 2.5 | 18.7 | 1/1.03/10 | 3.5/240/60 | 10/260/1 |
| 3 | 1000 | 13.3 | 2.0 | 22.4 | 1/1.03/15 | 3.5/240/60 | 10/260/1 |
| 4 | 1000 | 11.1 | 1.7 | 24.9 | 1/1.03/20 | 3.5/240/60 | 10/260/1 |
| 5 | 1000 | 33.0 | 5.0 | 18.6 | 1/1.03/5 | 2.4/240/60 | 10/260/1 |
| 6 | 1000 | 24.8 | 3.7 | 28.1 | 1/1.03/10 | 2.4/240/60 | 10/260/1 |
| 7 | 1000 | 19.9 | 3.0 | 33.7 | 1/1.03/15 | 2.4/240/60 | 10/260/1 |
| 8 | 1000 | 16.7 | 2.6 | 37.3 | 1/1.03/20 | 2.4/240/60 | 10/260/1 |
| 9 | 2000 | 24.5 | 1.9 | 6.9 | 1/1.05/5 | 4/240/40 | 10/260/1 |
| 10 | 2000 | 20.2 | 1.5 | 11.6 | 1/1.05/10 | 4/240/40 | 10/260/1 |
| 11 | 2000 | 17.3 | 1.3 | 14.7 | 1/1.05/15 | 4/240/40 | 10/260/1 |
| 12 | 2000 | 15.1 | 1.1 | 17.1 | 1/1.05/20 | 4/240/40 | 10/260/1 |
| 13 | 2000 | 39.2 | 3.0 | 11.1 | 1/1.05/5 | 2.5/240/40 | 10/260/1 |
| 14 | 2000 | 32.3 | 2.4 | 18.6 | 1/1.05/10 | 2.5/240/40 | 10/260/1 |
| 15 | 2000 | 27.7 | 2.1 | 23.5 | 1/1.05/15 | 2.5/240/40 | 10/260/1 |
| 16 | 2000 | 24.2 | 2.9 | 26.2 | 1/1.05/20 | 2.5/240/40 | 10/260/1 |
| 17 | 1000 | 22.0 | 3.3 | 12.4 | 1/1.03/5 | 3.5/240/60 | 20/260/1 |
| 18 | 1000 | 16.5 | 2.5 | 18.7 | 1/1.03/10 | 3.5/240/60 | 20/260/1 |
| 19 | 1000 | 13.3 | 2.0 | 22.4 | 1/1.03/15 | 3.5/240/60 | 20/260/1 |
| 20 | 1000 | 11.1 | 1.7 | 24.9 | 1/1.03/20 | 3.5/240/60 | 20/260/1 |
| 21 | 2000 | 33.0 | 5.0 | 18.6 | 1/1.05/5 | 4/240/40 | 20/260/1 |
| 22 | 2000 | 24.8 | 3.7 | 28.1 | 1/1.05/10 | 4/240/40 | 20/260/1 |
| 23 | 2000 | 19.9 | 3.0 | 33.7 | 1/1.05/15 | 4/240/40 | 20/260/1 |
| 24 | 2000 | 16.7 | 2.6 | 37.3 | 1/1.05/20 | 4/240/40 | 20/260/1 |

Elastomer Physical Property relates to Elastic Fiber Physical Property is shown in the following table:

| | Elastomer Physical Property | | | | Elastic Fiber Physical Property | | | | |
|---|---|---|---|---|---|---|---|---|---|
| e.g. | Relative polymerization In 0-chlorophenol 25° C. | Melting Point (° C.) | Stretch Strength (kg/cm$^2$) | Extensity (%) | Denier (4f) | Strength (g/d) | Extensity (%) | Extension Recovery (%) | Spin Relative Polymerization In 0-chlorophenol 25° C. |
| 1 | 1.93 | 191 | 550 | 632 | 100 | 1.10 | 526 | 93.9% | 1.87 |
| 2 | 2.05 | 193 | 587 | 597 | 100 | 1.17 | 497 | 94.4% | 1.93 |
| 3 | 2.07 | 199 | 613 | 425 | 100 | 1.22 | 354 | 96.5% | 1.94 |
| 4 | 2.13 | 209 | 680 | 320 | 100 | 1.36 | 269 | 99.5% | 1.97 |
| 5 | 1.87 | 190 | 510 | 617 | 100 | 1.02 | 514 | 93.7% | 1.84 |
| 6 | 1.96 | 191 | 547 | 583 | 100 | 1.09 | 486 | 94.2% | 1.89 |
| 7 | 2.03 | 195 | 602 | 410 | 100 | 1.20 | 372 | 96.6% | 1.92 |
| 8 | 2.05 | 206 | 632 | 310 | 100 | 1.26 | 285 | 99.0% | 1.93 |
| 9 | 1.78 | 183 | 470 | 780 | 100 | 0.94 | 650 | 92.7% | 1.73 |
| 10 | 1.81 | 187 | 487 | 653 | 100 | 0.97 | 544 | 93.4% | 1.80 |
| 11 | 1.97 | 193 | 503 | 597 | 100 | 1.00 | 497 | 93.8% | 1.89 |
| 12 | 2.01 | 195 | 530 | 530 | 100 | 1.06 | 441 | 94.5% | 1.91 |
| 13 | 1.70 | 181 | 420 | 760 | 100 | 0.84 | 633 | 92.5% | 1.69 |
| 14 | 1.74 | 183 | 450 | 589 | 100 | 0.91 | 491 | 93.4% | 1.71 |
| 15 | 1.89 | 185 | 495 | 537 | 100 | 0.99 | 448 | 94.1% | 1.78 |
| 16 | 1.97 | 190 | 517 | 495 | 100 | 1.03 | 413 | 95.1% | 1.89 |
| 17 | 1.95 | 192 | 560 | 568 | 100 | 1.12 | 473 | 95.3% | 1.88 |
| 18 | 2.10 | 194 | 591 | 503 | 100 | 1.18 | 419 | 95.7% | 1.95 |
| 19 | 2.13 | 201 | 617 | 410 | 100 | 1.23 | 341 | 96.8% | 1.97 |
| 20 | 2.20 | 208 | 695 | 280 | 100 | 1.39 | 254 | 99.0% | 2.00 |
| 21 | 1.89 | 187 | 490 | 793 | 100 | 0.98 | 660 | 92.3% | 1.85 |
| 22 | 1.93 | 192 | 503 | 701 | 100 | 1.01 | 584 | 93.2% | 1.87 |
| 23 | 2.07 | 195 | 523 | 623 | 100 | 1.05 | 519 | 93.7% | 1.94 |
| 24 | 2.10 | 199 | 554 | 587 | 100 | 1.11 | 490 | 94.2% | 1.96 |

What is claimed is:

1. A manufacturing process of a polyether-ester amide elastomer, comprising the steps of:

(a) melting a poly (tetra methylene ether) glycol (PTMG) reactant, a ε-caprolactam (CPL) reactant and an adipic acid (AA) reactant respectively by heating;

(b) injecting a predetermined amount and ratio of said melted PTMG reactant, said melted CPL, reactant and said melted AA reactant into a high efficiency static mixer;

(c) pre-polymerizing said melted PTMG, CPL and AA reactants by heating said melted PTMG, CPL and AA reactants in said static mixer for esterification reaction, wherein said a water content formed during said esterification reaction triggers said CPL reactant to process a ring-opening reaction and a pre-polymer is gradually formed after a predetermined reacting time period; and (d) highly polymerizing said pre-polymer in a film type evaporator for 3 to 30 minutes, wherein said pre-polymer is injected from said static mixer into a film type evaporator to form a polyether-ester amide elastomer.

2. A manufacturing process of a polyether-ester amide elastomer, as recited in claim 1, after said step (d), further comprising the step of:

(e) rapidly cooling said polyether-ester amide elastomer discharged from said film type evaporator; and (f) solidifying and cutting said cooled polyether-ester amide elastomer.

3. A manufacturing process of a polyether-ester amide elastomer, as recited in claim 2, in step (d), wherein a catalyst that is required for said high polymerization reaction is injected into said film type evaporator 5 by gear pumping simultaneously.

4. A manufacturing process of a polyether-ester amide elastomer, as recited in claim 1, in said step (a), wherein a mole ratio of said AA reactant and said PTMG reactant is 1.0–1.06:1 and a mole ratio of said CPL reactant and said PTMG reactant is 5–20:1.

5. A manufacturing process of a polyether-ester amide elastomer, as recited in claim 3, in said step (a), wherein a mole ratio of said AA reactant and said PTMG reactant is 1.01–1.06:1 and a mole ratio of said CPL reactant and said PTMG reactant is 5–20:1.

6. A manufacturing process of a polyether-ester amide elastomer, as recited in claim 1, in said step (a), wherein a molecular weight of said PTMG reactant is between 500 g/mole to 3000 g/mole.

7. A manufacturing process of a polyether-ester amide elastomer, as recited in claim 4, in said step (a), wherein a molecular weight of said PTMG reactant is between 500 g/mole to 3000 g/mole.

8. A manufacturing process of a polyether-ester amide elastomer, as recited in claim 5, in said step (a), wherein a molecular weight of said PTMG reactant is between 500 g/mole to 3000 g/mole.

9. A manufacturing process of a polyether-ester amide elastomer, as recited in claim 1, in said step (a), wherein a stabilizer and a primary catalyst are added to said PTMG reactant, said CPL reactant and said AA reactant respectively for well mixing.

10. A manufacturing process of a polyether-ester amide elastomer, as recited in claim 8, in said step (a), wherein a stabilizer and a primary catalyst are added to said PTMG reactant, said CPL reactant and said AA reactant respectively for well mixing.

11. A manufacturing process of a polyether-ester amide elastomer, as recited in claim 1, in said step (c), wherein said static mixer has a temperature of between 200° C. to 260° C. and a decree of vacuum between 10 torr to normal pressure, and that said melted PTMG, CPL and AA reactants are retained in said static mixer for one to four hours.

12. A manufacturing process of a polyether-ester amide elastomer, as recited in claim 8, in said step (c), wherein said static mixer has a temperature of between 200° C. to 260° C. and a degree of vacuum between 10 torr to normal pressure, and that said melted PTMG, CPL, and AA reactants are retained in said static mixer for one to four hours.

13. A manufacturing process of a polyether-ester amide elastomer, as recited in claim 1, in said step (d), wherein said film type evaporator has a temperature of 240° C. to 280° C. and a vacuum degree of 0.1 torr to 50 torr.

14. A manufacturing process of a polyether-ester amide elastomer, as recited in claim 12, in said step (d), wherein said film type evaporator has a temperature of 240° C. to 280° C. and a vacuum degree of 0.1 torr to 50 torr.

15. A manufacturing process of a polyether-ester amide elastomer, as recited in claim 1, wherein said film type evaporator comprises an inner cylinder coaxially disposed in an outer heating sleeve, said pre-polymer being transmitted into said inner cylinder through an inlet of said film type evaporator, said film type evaporator further comprising a driving means to drive a plurality of mixing paddles, which are coaxially extended inside said inner cylinder, to rotate in a predetermined high speed so as to scrape said pre-polymer positioned between said mixing paddles and a surrounding wall of said inner cylinder to form a thin film of pre-polymer, said film type evaporator further having an inlet passage to communicate with said outer heating sleeve, wherein a heated hot media is injected into said outer heating sleeve through said inlet passage in order to heat said inner cylinder and said thin film of pre-polymer inside said inner cylinder for advancing said polymerization reaction, an interior chamber of said inner cylinder is vacuumed to achieve an extremely low pressure condition, wherein when said thin film pre-polymer being under low pressure and heating condition, unreactants, oligomers and a water content are rapidly removed by sucking out from a waste outlet provided on said inner cylinder, moreover, said high polymerization reaction is accelerated and said ester generated by said pre-polymer is quickly combined with a CPL ring-opening matter.

16. A manufacturing process of a polyether-ester amide elastomer, as recited in claim 4, wherein said film type evaporator comprises an inner cylinder coaxially disposed in an outer heating sleeve, said pre-polymer being transmitted into said inner cylinder through an inlet of said film type evaporator, said film type evaporator further comprising a driving means to drive a plurality of mixing paddles, which are coaxially extended inside said inner cylinder, to rotate in a predetermined high speed so as to scrape said pre-polymer positioned between said mixing paddles and a surrounding wall of said inner cylinder to form a thin film of pre-polymer, said film type evaporator further having an inlet passage to communicate with said outer heating sleeve, wherein a heated hot media is injected into said outer heating sleeve through said inlet passage in order to heat said inner cylinder and said thin film of pre-polymer inside said inner cylinder for advancing said polymerization reaction, an interior chamber of said inner cylinder being vacuumed to achieve an extremely low pressure condition, wherein said thin film pre-polymer is under low pressure and heating condition, unreactants, oligomers and a water content are rapidly removed by sucking out from a waste outlet provided on said inner cylinder, moreover, said high polymerization reaction is accelerated and said ester generated by said pre-polymer is quickly combined with a CPL ring-opening matter.

17. A manufacturing process of a polyether-ester amide elastomer, as recited in claim 1, wherein said polyether-ester amide elastomer is further processed to produce a polyether-ester amide elastic fiber by drying said polyether-ester amide elastomer in a drying device, extruding said dried polyether-ester amide elastomer, and molten spinning said extruded polyether-ester amide elastomer to form a polyether-ester amide elastic fiber.

18. A manufacturing process of a polyether-ester amide elastomer, as recited in claim 16, wherein said polyether-ester amide elastomer is further processed to produce a polyether-ester amide elastic fiber by drying said polyether-ester amide elastomer in a drying device, extruding said dried polyether-ester amide elastomer by an extruder, and molten spinning said extruded polyether-ester amide elastomer to form a polyether-ester amide elastic fiber.

19. A manufacturing process of a polyether-ester amide elastomer, as recited in claim 18, wherein said polyether-ester amide elastomer is placed and dried inside a drying device for 24 to 48 hours until a water content of said polyether-ester amide elastomer is below 300 ppm.

20. A manufacturing process of a polyether-ester amide elastomer, as recited in claim 19, wherein a dry nitrogen gas is injected into said drying device to for removing said water content.

21. A manufacturing process of a polyether-ester amide elastomer, as recited in claim 20, wherein said extruder is connected to said drying device and has a temperature of at 220° C. to 240° C., a pressure of at 160 to 200 kg/cm2 and a rotation speed of 2–50 rpm.

22. A manufacturing process of a polyether-ester amide elastomer, as recited in claim 21, wherein a two-piece spinning orifice assembly is arranged after said extruder, which output end connected to a cooling fan and then a spin tube, wherein said two-piece spinning orifice assembly comprises a first spinning orifice having a size of L/D=2 and a second spinning orifice having a size of L/D=3, said molten polyether-ester amide elastomer strengthening said polyether-ester amide elastic fiber produced.

23. A manufacturing process of a polyether-ester amide elastomer, as recited in claim 22, wherein said polyether-ester amide elastic fiber output from said spin tube is fed to a first godet roll and then a second godet roll, wherein a rotation speed ratio between said first godet roll and said second godet roll is 1/1 to 1/4, and said extension ratio between said first godet roll and said second godet roll is 1 to 4 times.

* * * * *